United States Patent
Goto

(10) Patent No.: US 12,512,609 B2
(45) Date of Patent: Dec. 30, 2025

(54) CURRENT BRANCHING DEVICE

(71) Applicant: Sumitomo Wiring Systems, Ltd., Yokkaichi (JP)

(72) Inventor: Hideki Goto, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 504 days.

(21) Appl. No.: 17/905,339

(22) PCT Filed: Feb. 19, 2021

(86) PCT No.: PCT/JP2021/006312
§ 371 (c)(1),
(2) Date: Aug. 31, 2022

(87) PCT Pub. No.: WO2021/182073
PCT Pub. Date: Sep. 16, 2021

(65) Prior Publication Data
US 2023/0125831 A1  Apr. 27, 2023

(30) Foreign Application Priority Data
Mar. 11, 2020 (JP) .................. 2020-041938

(51) Int. Cl.
*H01R 4/02* (2006.01)
*H01B 7/00* (2006.01)
(Continued)

(52) U.S. Cl.
CPC ............ *H01R 4/021* (2013.01); *H01B 7/009* (2013.01); *H01R 4/023* (2013.01); *H01R 11/09* (2013.01); *H01R 11/12* (2013.01)

(58) Field of Classification Search
CPC ........ H01B 7/009; H01R 11/09; H01R 11/12; H01R 11/32; H01R 31/02; H01R 4/021;
(Continued)

(56) References Cited

U.S. PATENT DOCUMENTS 6,042,431 A * 3/2000 Hayakawa ............. H01R 4/305
439/883
6,225,561 B1 * 5/2001 Mori ................... B60R 16/0207
174/154
(Continued)

FOREIGN PATENT DOCUMENTS

JP  S56150076 U  * 11/1981  ............... H01B 7/00
JP  H9-027377      1/1997
(Continued)

OTHER PUBLICATIONS

International Search Report, Application No. PCT/JP2021/006312, mailed May 11, 2021. ISA/Japan Patent Office.

*Primary Examiner* — Timothy J Thompson
*Assistant Examiner* — Rhadames Alonzo Miller
(74) *Attorney, Agent, or Firm* — Honigman LLP

(57) ABSTRACT

Provided is a current branching device for branching a current and supplying the current to a plurality of supply destinations, including a branch member welded to a main conductive wire at an intermediate portion of the main conductive wire for supplying a current to one supply destination, and at least one branch conductive wire welded to the branch member, for supplying a current to another supply destination.

7 Claims, 9 Drawing Sheets

(51) Int. Cl.
*H01R 11/09* (2006.01)
*H01R 11/12* (2006.01)

(58) Field of Classification Search
CPC .......... H01R 4/023; H01R 4/029; H01R 4/34; H02G 15/08; H02J 1/00
See application file for complete search history.

(56) References Cited

U.S. PATENT DOCUMENTS

| | | | |
|---|---|---|---|
| 6,385,845 B2 * | 5/2002 | Mori ................... | B60R 16/0207 29/850 |
| 2002/0155753 A1 * | 10/2002 | Yamanashi ........ | H01R 13/5219 439/509 |
| 2003/0030206 A1 * | 2/2003 | Masukawa .......... | B60R 16/0215 118/500 |
| 2009/0314511 A1 * | 12/2009 | Hagi ................... | H01R 9/0512 174/78 |
| 2015/0000974 A1 * | 1/2015 | Shiga ................. | H02G 3/22 174/72 A |
| 2019/0126865 A1 * | 5/2019 | Takamatsu ............. | H04L 12/10 |
| 2019/0392963 A1 * | 12/2019 | Ishida .................. | H01B 7/0045 |

FOREIGN PATENT DOCUMENTS

| | | |
|---|---|---|
| JP | 2000-030769 A | 1/2000 |
| JP | 2013-045622 A | 3/2013 |
| JP | 2016-081625 A | 5/2016 |
| JP | 2018-116899 A | 7/2018 |
| JP | 2019-170126 A | 10/2019 |

* cited by examiner

CURRENT BRANCHING DEVICE

CROSS-REFERENCE TO RELATED APPLICATIONS

This application is the U.S. national stage of PCT/JP2021/006312 filed on Feb. 19, 2021, which claims priority of Japanese Patent Application No. JP 2020-041938 filed on Mar. 11, 2020, the contents of which are incorporated herein.

TECHNICAL FIELD

The present disclosure relates to a current branching device for branching a current.

BACKGROUND

Recent years have seen an increase in the number of electrical components mounted in vehicles, and a current branching device is used in order to supply power from a power source to a plurality of electrical components.

For example, JP 2019-170126A discloses a branch type bus bar, in which a main part and branched parts that are branched from the main part are formed in one piece, as a current branching device. According to the disclosed branch type bus bar, the generation of heat and noise that occurs when the main part and branch parts are connected by a bolt or the like can be suppressed.

Meanwhile, following an increase in the number of electrical components in recent years, more electrical components through which a large current flows are being installed. That is, it is becoming more common for large currents to be supplied to electrical components via a bus bar, and in order to be able to handle large currents, bus bars are being made larger.

As described above, while the size of bus bars has been increased in order to handle to a large current, the shape of bus bars has become complex in order to branch a current from a power source to supply the current to a plurality of electrical components.

However, if the size of a bus bar is increased, the weight and the thickness of the bus bar are also increased, leading to the issue of it being difficult to process the bus bars into a complex shape.

However, in the branch type bus bar in JP 2019-170126A, a current is still branched using a branch-type bus bar, and thus the issue of the weight of the bus bar being increased following an increase in the size of the bus bar, and processing of the bus bar being difficult remains unsolved.

In view of this, an object of the present disclosure is to provide a current branching device with which a current can be branched and supplied to a plurality of electrical components without using a bus bar.

SUMMARY

A current branching device according to an embodiment of the present disclosure is a current branching device for branching a current and supplying the current to a plurality of supply destinations, including a branch member welded to a main conductive wire at an intermediate portion of the main conductive wire for supplying a current to one supply destination, and at least one branch conductive member welded to the branch member, for supplying a current to another supply destination that is different from the one supply destination.

Effects of the Present Disclosure

According to the present disclosure, a current can be branched and supplied to a plurality of electrical components without using a bus bar.

DETAILED DESCRIPTION OF PREFERRED EMBODIMENTS

Figure 1:
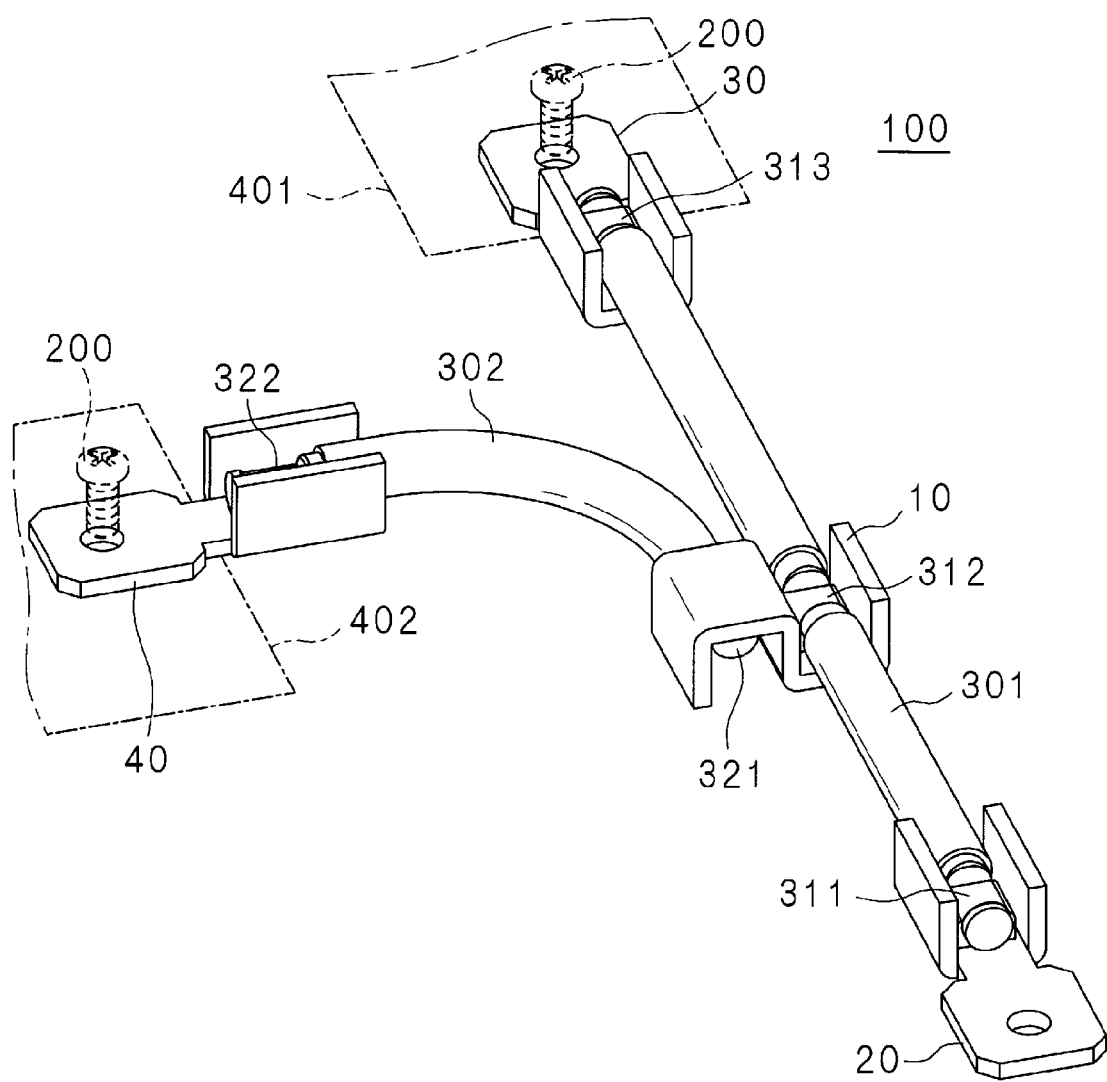
FIG. 1 is a perspective view showing the outer appearance of a current branching device according to a first embodiment.

First, embodiments of the present disclosure will be listed and described. Also, at least a portion of the embodiments described below can be combined as appropriate.

First Embodiment

A current branching device according to a first embodiment of the present disclosure is a current branching device for branching a current and supplying the current to a plurality of supply destinations, including a branch member welded to a main conductive wire at an intermediate portion of the main conductive wire for supplying a current to one supply destination, and at least one branch conductive member welded to the branch member, for supplying a current to another supply destination that is different from the one supply destination.

In the first embodiment, the branch member is welded to the main conductive wire at the intermediate portion of the main conductive wire for supplying a current to one supply destination, and a current is supplied to the other supply destination from the branch member via the branch conductive member. Accordingly, a current can be branched without using a bus bar, and the generation of heat and noise can also be suppressed.

Second Embodiment

In the current branching device according to a second embodiment of the present disclosure, a configuration is also possible in which the branch member includes a main line fixing portion to which the main conductive wire is welded, and a branch fixing portion to which the branch conductive member is welded, and the main line fixing portion and the branch fixing portion have a groove-like shape, are arranged side by side in a width direction, and are open to opposite sides to each other.

In the second embodiment, the main line fixing portion and the branch fixing portion of the branch member are formed in a groove-like shape, and are arranged side by side in the width direction with the open sides thereof facing opposite sides. The branch member configured as above can be easily manufactured by pressing a metal plate member, for example.

Third Embodiment

In the current branching device according to a third embodiment of the present disclosure, a configuration is also possible in which the branch member includes a main line fixing portion to which the main conductive wire is welded, and a branch fixing portion to which the branch conductive member is welded, and the main line fixing portion and the branch fixing portion have a groove-like shape, are arranged side by side in a longitudinal direction thereof, and are open in directions intersecting each other.

In the third embodiment, the main line fixing portion and the branch fixing portion of the branch member are shaped in a groove-like shape, and are arranged side by side in the lengthwise direction with the open sides thereof intersecting each other. Accordingly, wiring in a direction intersecting the main conductive wire is facilitated.

Fourth Embodiment

In the current branching device according to a fourth embodiment of the present disclosure, a configuration is also possible in which the branch member includes a main line fixing portion that is formed in a groove-like shape and to which the main conductive wire is welded, and the branch conductive member has a plate-like shape, and is provided with a through hole used to fix the branch conductive member to the other supply destination.

In the fourth embodiment, the branch conductive member is formed in a plate-like shape, and the branch conductive member, that is, the branch member is fixed and electrically connected to the other supply destination using the through hole. Accordingly, the current branching device can be made more compact, and stress acting on fixing portions at two ends of the main conductive wire can be reduced.

Fifth Embodiment

In the current branching device according to a fifth embodiment of the present disclosure, a configuration is also possible in which the branch conductive member is a conductive wire, and is thinner than the main conductive wire.

In the fifth embodiment, a portion of the current branched by the branch member flows into the branch conductive member, and thus a conductive wire thinner than the main conductive wire is used as the branch conductive member. Accordingly, the weight and manufacturing cost of the current branching device can be reduced.

A current branching device according to embodiments of the present disclosure will be described below with reference to the drawings. Note that the present disclosure is not limited to these examples, but is indicated by the claims, and all changes that come within the meaning and range of equivalency of the claims are intended to be embraced therein.

First Embodiment

FIG. 1 is a perspective view showing the outer appearance of a current branching device 100 according to a first embodiment. The current branching device 100 branches a current that is output from a 100 to 500V high pressure power source (battery) of such as that of an EV or PHV and supplies the current to a plurality of electrical components.

The current branching device 100 is connected to the power source side, and includes a main conductive wire 301 for supplying a current to one supply destination, a branch member 10 that is connected to the main conductive wire 301 at an intermediate portion of the main conductive wire 301, and a branch conductive wire 302 (branch conductive member) that is connected to the branch member 10 and supplies a current to another supply destination.

The main conductive wire 301 is a copper wire covered with an insulative material, and a power source side terminal 20 is provided at one end of the power source, and a supply destination terminal 30 is provided at another end thereof. The main conductive wire 301 has a cross section that can handle a large current (e.g., 1000 A).

At one end of the main conductive wire 301, an exposed copper wire from which the coating has been stripped is fixed and electrically connected to the power source side terminal 20. The power source side terminal 20 is connected to a battery (not shown), for example. At the other end of the main conductive wire 301 as well, an exposed copper wire is fixed and electrically connected to the supply destination terminal 30. The supply destination terminal 30 is fixed to an electrical component 401 (supply destination) using a bolt 200, for example. The one end and the other end of the main conductive wire 301 are respectively welded to the power source side terminal 20 and the supply destination terminal 30 using ultrasonic welding, for example.

An intermediate portion of the main conductive wire 301 is exposed with the coating stripped away, and the exposed copper wire is welded and electrically connected to the branch member 10. The branch member 10 is welded to the copper wire of the intermediate portion of the main conductive wire 301 using ultrasonic welding, for example.

The branch conductive wire 302 is a copper wire covered with an insulating material. One end of the branch conductive wire 302 is connected to the branch member 10, and the other end thereof is connected to a supply destination terminal 40. The supply destination terminal 40 is fixed to an electrical component 402 (supply destination), which is different from the electrical component 401, using a bolt 200, for example. The one end of the branch conductive wire 302 is welded to the branch member 10, and the other end thereof is welded to the supply destination terminal 40 using ultrasonic welding, for example.

Figure 2:
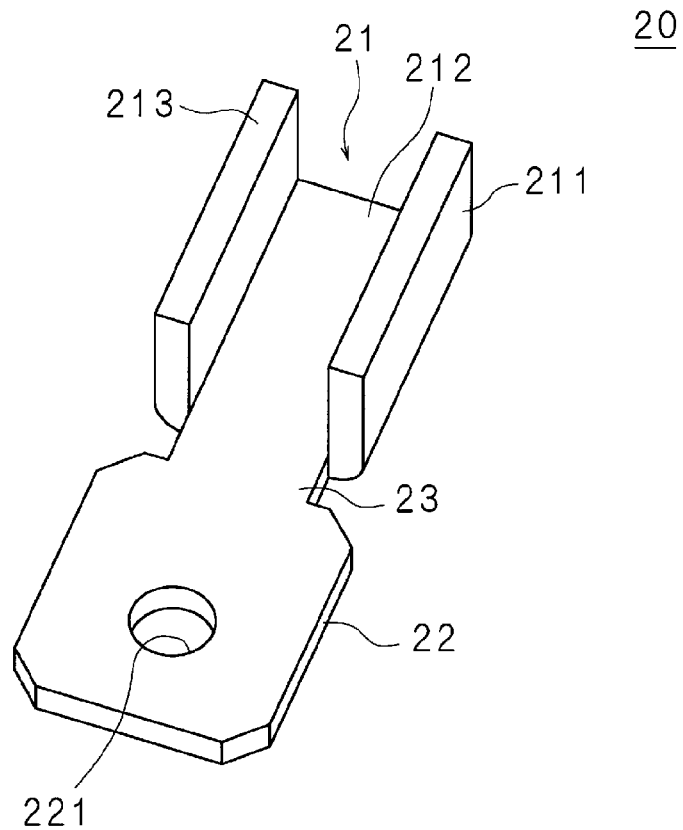
FIG. 2 is a perspective view showing a power source side terminal.

FIG. 2 is a perspective view showing a power source side terminal 20. Hereinafter, the power source side terminal 20 will be described in detail based on FIG. 2. Note that, since the supply destination terminals 30 and 40 have the same shape as the power source side terminal 20, descriptions thereof will be omitted.

The power source side terminal 20 is formed by a conductive metal plate member, and includes a copper wire fixing portion 21 to which an end of the main conductive wire 301 is welded and a power source fixing portion 22 to be fixed to a battery, for example. The copper wire fixing portion 21 and the power source fixing portion 22 are linked by a neck portion 23. The copper wire fixing portion 21, the power source fixing portion 22, and the neck portion 23 are formed in one piece.

The copper wire fixing portion 21 has a groove-like shape, and includes a rectangular bottom plate 212, and rectangular side plates 211 and 213 that stand perpendicular to edges of the two long sides of the bottom plate 212.

The neck portion 23 extends from one end of the bottom plate 212 in the longitudinal direction, and is interposed between the bottom plate 212 and the power source fixing portion 22. The bottom plate 212, the neck portion 23, and the power source fixing portion 22 are flush with each other. The length of the bottom plate 212 in the width direction of the copper wire fixing portion 21 is the same as that of the neck portion 23, and the length of the power source fixing portion 22 in the width direction of the copper wire fixing portion 21 is greater than that of the bottom plate 212 and the neck portion 23.

The power source fixing portion 22 has a substantially square plate-like shape, and a through hole 221 is formed in the central portion thereof. The four corners of the power source fixing portion 22 are C-chamfered. For example, the power source side terminal 20 is fixed to the battery by inserting a bolt into the through hole 221 and screwing the bolt to a screw hole provided in the battery.

The exposed copper wire at the one end of the main conductive wire 301 is placed on and supersonic-welded to the inner side (bottom plate 212) of the copper wire fixing portion 21, for example. At this time, the copper wire at the one end of the main conductive wire 301 is brought into close contact with the bottom plate 212 and the side plates 211 and 213 while forming a flat welded portion 311 (see FIG. 1). In this manner, the one end of the main conductive wire 301 is welded and electrically connected to the power source side terminal 20.

Similarly to the power source side terminal 20, the supply destination terminals 30 and 40 are respectively welded to the other end of the main conductive wire 301 and the other end of the branch conductive wire 302 while welded portions 313 and 322 are also formed.

Figure 3A:
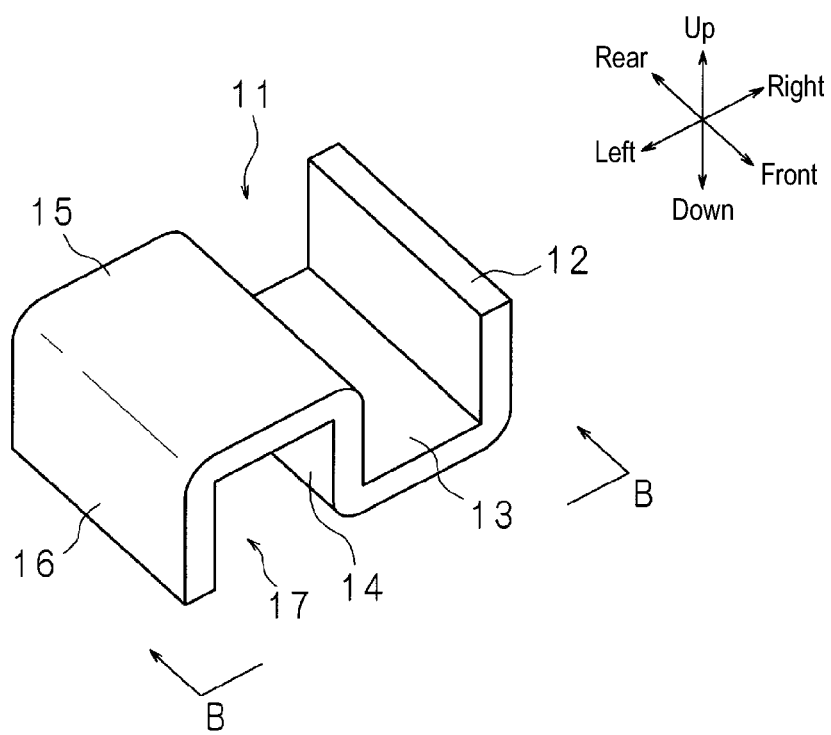
FIG. 3A is a perspective view showing a branch member.
Figure 3B:
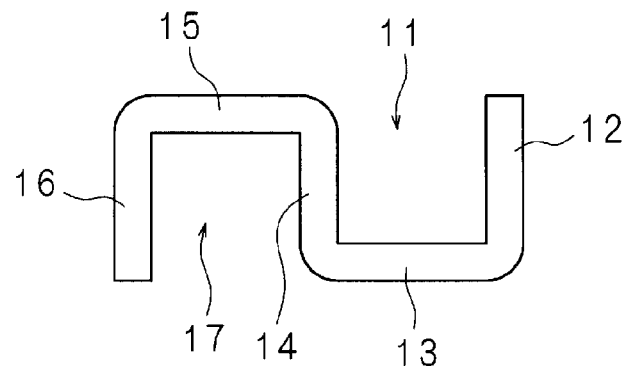
FIG. 3B is a diagram as seen along arrows B-B in FIG. 3A.

FIG. 3 is a perspective view showing a branch member 10. FIG. 3B is a diagram as seen along arrows B-B in FIG. 3A.

The branch member 10 is formed by a conductive metal plate member and includes a main line fixing portion 11 to which the intermediate portion of the main conductive wire 301 is welded and a branch fixing portion 17 to which the one end of the branch conductive wire 302 is welded. The main line fixing portion 11 and the branch fixing portion 17 are adjacent to each other and have the same groove-like shape. The main line fixing portion 11 and the branch fixing portion 17 are open to opposite sides to each other. In other words, the main line fixing portion 11 has a U-shaped vertical cross section, and the branch fixing portion 17 has an inverse U-shaped vertical cross section. The main line fixing portion 11 and the branch fixing portion 17 are formed in one piece. The main line fixing portion 11 and the branch fixing portion 17 are arranged side by side in the width direction.

Specifically, side plates 12, 14, and 16 that have the same rectangular shape are arranged side by side in the left-right direction, and the side plates 12, 14, and 16 stand perpendicularly. A bottom plate 13 is provided spanning between the edges on the lower long sides of the side plates 12 and 14. The side plates 12, 14 and the bottom plate 13 constitute the main line fixing portion 11. Also, a top plate 15 is provided spanning the edges of the upper long sides of the side plates 14 and 16, and the side plates 14, 16 and the top plate 15 constitute the branch fixing portion 17.

The exposed copper wire at the intermediate portion of the main conductive wire 301 is placed and supersonic-welded to the inner side of the main line fixing portion 11, for example. At this time, the copper wire at the intermediate portion of the main conductive wire 301 is brought into close contact with the bottom plate 13 and the side plates 12 and 14 while forming a flat welded portion 312 (see FIG. 1). In this manner, the intermediate portion of the main conductive wire 301 is welded and electrically connected to the main line fixing portion 11 (branch member 10).

Also, the exposed copper wire at the one end of the branch conductive wire 302 is placed on and supersonic-welded to the inner side of the branch fixing portion 17, for example. At this time, the copper wire at the one end portion of the branch conductive wire 302 is brought into close contact with the top plate 15 and the side plates 14 and 16 while forming a flat welded portion 321 (see FIG. 1). In this manner, the one end of the branch conductive wire 302 is welded and electrically connected to the branch fixing portion 17 (branch member 10).

Accordingly, in the current branching device 100, a current from the power source side first flows through the main conductive wire 301 via the power source side terminal 20, and is branched at the intermediate portion of the main conductive wire 301 by the branch member 10. A portion of the current flows through the main conductive wire 301 to the supply destination terminal 30 (electrical component 401), and the remaining current flows to the supply destination terminal 40 (electrical component 402) via the branch conductive wire 302.

In this manner, in the current branching device 100 of the first embodiment, a current can be branched and supplied to a plurality of electrical components without using a bus bar. Since the branch member 10 is welded to the main conductive wire 301 and the branch conductive wire 302, the generation of heat and noise can be suppressed.

Also, since a conductive wire (copper wire) is used in the current branching device 100 of the first embodiment, when attaching the current branching device 100, the conductive wire can be freely bent, and the degree of freedom in an attachment operation is increased.

Also, since a conductive wire is used in the current branching device 100 of the first embodiment, a design tolerance or a design mistake can be dealt with. Also, extension of the copper wire due to heat generated when a current flows through the current branching device 100 can also be absorbed by deformation such as bending, and thus no stress acts on the portions fixed to the battery, and the portions fixed to the electrical components 401 and 402 and the like.

Further, in the current branching device 100, since the branch member 10 branches a current at the intermediate portion of the main conductive wire 301, a plurality of branch members 10 can be attached to one main conductive wire 301. Accordingly, the devices to which the current branching device 100 is attached can be made more compact.

Note that the branch member 10 having the above-described configuration can be easily manufactured by bending a metal plate member using a press. Accordingly, the manufacturing cost can be reduced compared to a case in which the branch member 10 is manufactured through casting or cutting.

Figure 4:
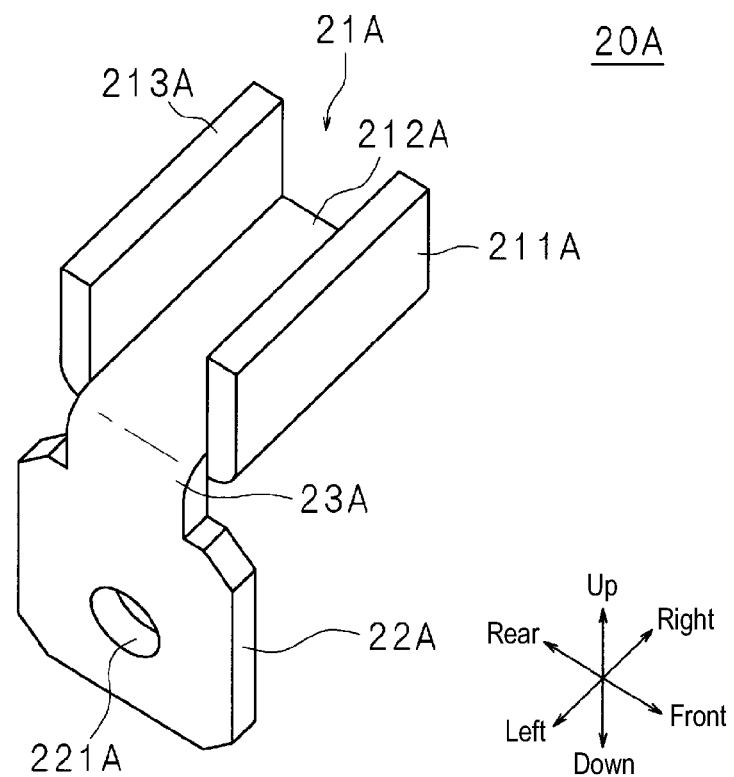
FIG. 4 is a diagram showing a variation of the power source side terminal.

The power source side terminal 20 of the current branching device 100 of the first embodiment is not limited to the above description. FIG. 4 is a diagram showing a variation of the power source side terminal 20. Hereinafter, the variation of the power source side terminal 20 in FIG. 4 is referred to as a power source side terminal 20A.

As shown in FIG. 4, the power source side terminal 20A includes a copper wire fixing portion 21A to which the one end of the main conductive wire 301 is welded, and a power source fixing portion 22A to be fixed to a battery, for example. The copper wire fixing portion 21A has a groove-like shape, and includes a rectangular bottom plate 212A and rectangular side plates 211A and 213A that stand perpendicular to edges of both long sides of the bottom plate 212A. The power source fixing portion 22A is substantially formed in a square plate-like shape, and a through hole 221A is formed in the central portion thereof. The copper wire fixing portion 21A and the power source fixing portion 22A are the same as the copper wire fixing portion 21 and the power source fixing portion 22 that have already been described using FIG. 2.

The copper wire fixing portion 21A and the power source fixing portion 22A are linked by a neck portion 23A. The neck portion 23A extends downward from one end of the bottom plate 212A in the longitudinal direction. The power source fixing portion 22A extends from the lower end of the neck portion 23A. In other words, in the power source side terminal 20A, the power source fixing portion 22A is provided perpendicular to the bottom plate 212A of the copper wire fixing portion 21A. The copper wire fixing portion 21A, the power source fixing portion 22A, and the neck portion 23A are formed in one piece.

Due to the power source side terminal 20 or the power source side terminal 20A being selectively attached to the one end of the main conductive wire 301 as necessary, the degree of freedom when attaching the current branching device 100 of the first embodiment is increased. Note that, needless to say, the shape of the power source side terminal 20A can be applied to the supply destination terminals 30, 40, and 50 as well.

Figure 5:
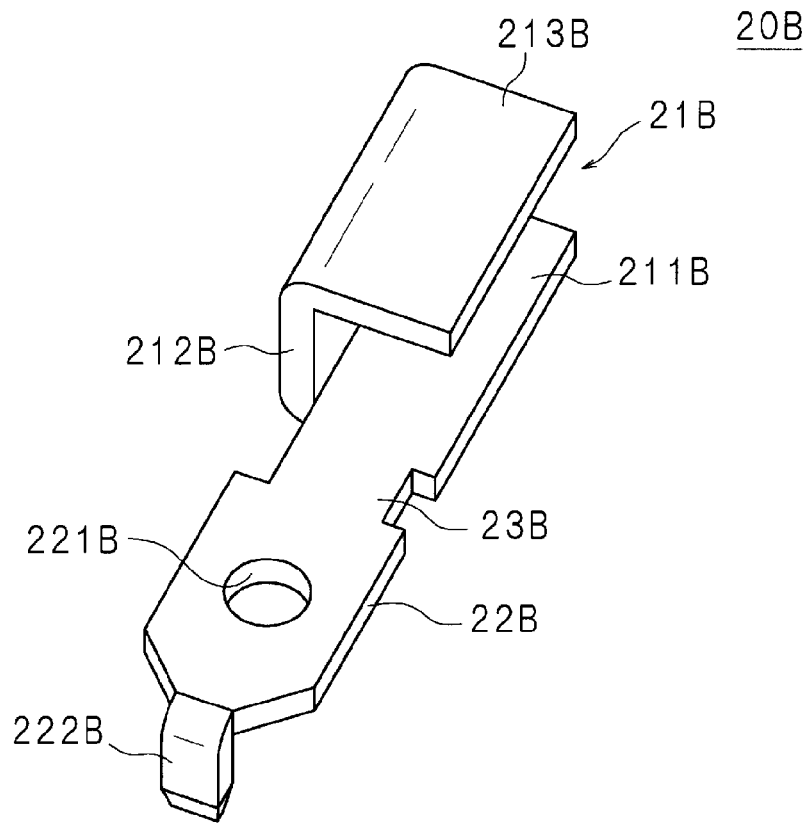
FIG. 5 is a diagram showing another variation of the power source side terminal.

FIG. 5 is a diagram showing another variation of the power source side terminal 20. Hereinafter, the variation of the power source side terminal 20 is referred to as a power source side terminal 20B.

As shown in FIG. 5, the power source side terminal 20B includes a copper wire fixing portion 21B to which one end of the main conductive wire 301 is welded, and a power source fixing portion 22B to be fixed to the battery, for example. The copper wire fixing portion 21B has a groove-like shape, and includes a rectangular bottom plate 212B and rectangular side plates 211B and 213B that stand perpendicular to edges on both long sides of the bottom plate 212B. The copper wire fixing portion 21B is similar to the copper wire fixing portion 21 that was described using FIG. 2.

The copper wire fixing portion 21B and the power source fixing portion 22B are linked by a neck portion 23B. In other words, the neck portion 23B extends from an edge of one short side of the side plate 211B, and is interposed between the side plate 211B and the power source fixing portion 22B. The side plate 211B, the neck portion 23B, and the power source fixing portion 22B are flush with each other and are formed in one piece. The neck portion 23B is partially provided on the edge of one short side of the side plate 211B. A through hole 221B is formed in the central portion of the power source fixing portion 22B.

Further, the width of the power source fixing portion 22B is gradually reduced toward the leading end thereof. A positioning portion 222B for positioning the power source side terminal 20B through engagement with a hole provided in the battery, for example, is provided at the leading end of the power source fixing portion 22B. The positioning portion 222B extends from the leading end of the power source fixing portion 22B outward of the copper wire fixing portion 21B in a thickness direction of the power source fixing portion 22B. The copper wire fixing portion 21B, the power source fixing portion 22B, and the neck portion 23B are formed in one piece.

Accordingly, the power source side terminal 20B is temporarily positioned by the positioning portion 222B and then fixed to the battery by a bolt that is inserted into the through hole 221B, and thus workability in a fixing operation can be improved.

Further, by selectively attaching the power source side terminal 20, the power source side terminal 20A, or the power source side terminal 20B to the one end of the main conductive wire 301, the degree of freedom when attaching the current branching device 100 of the first embodiment is further increased. Note that, needless to say, the shape of the power source side terminal 20B can be applied to the supply destination terminals 30, 40, and 50 as well.

Figure 6:
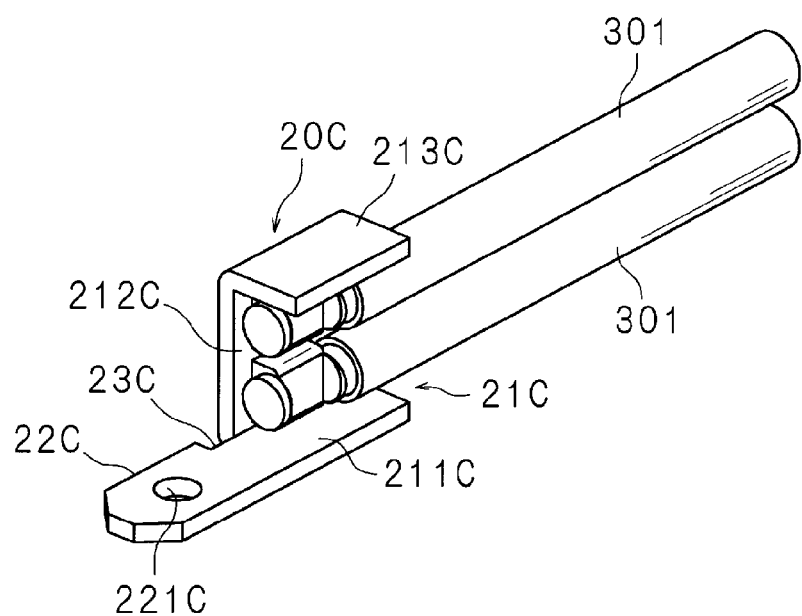
FIG. 6 is a diagram showing another variation of the power source side terminal.

FIG. 6 is a diagram showing another variation of the power source side terminal 20. Hereinafter, the variation of the power source side terminal 20 is referred to as a power source side terminal 20C.

As shown in FIG. 6, the power source side terminal 20C includes a copper wire fixing portion 21C to which the ends of two main conductive wires 301 are welded, and a power source fixing portion 22C to be fixed to a battery, for example. The copper wire fixing portion 21C has a groove-like shape, and includes a rectangular bottom plate 212C and rectangular side plates 211C and 213C that stand perpendicular to two corresponding side edges of the bottom plate 212C.

The length of the bottom plate 212C in the width direction of the copper wire fixing portion 21C corresponds to the size of the two main conductive wires 301. Also, the exposed copper wires at the one end of the main conductive wires 301 are welded using supersonic-welding, for example, to the inner side of the copper wire fixing portion 21C and onto the bottom plate 212C.

The copper wire fixing portion 21C and the power source fixing portion 22C are linked by a neck portion 23C. In other words, the neck portion 23C is interposed between the side plate 211C and the power source fixing portion 22C, and extends from an edge of one short side of the side plate 211C. The side plate 211C, the neck portion 23C and the power source fixing portion 22C are flush with each other and formed in one piece.

Similarly to the power source fixing portion 22B in FIG. 5, the width of the power source fixing portion 22C is gradually reduced toward the leading end thereof, but the power source fixing portion 22C has no positioning portion. Also, a through hole 221C is formed in the central part of the power source fixing portion 22C. The copper wire fixing portion 21C, the power source fixing portion 22C, and the neck portion 23C are formed in one piece.

Accordingly, the end portions of the two main conductive wires 301 can be collectively connected to the power source side simultaneously. Note that, by increasing the length of the bottom plate 212C in the width direction of the copper wire fixing portion 21C, three or more main conductive wires 301 can be collectively connected to the power source side simultaneously.

Figure 7:
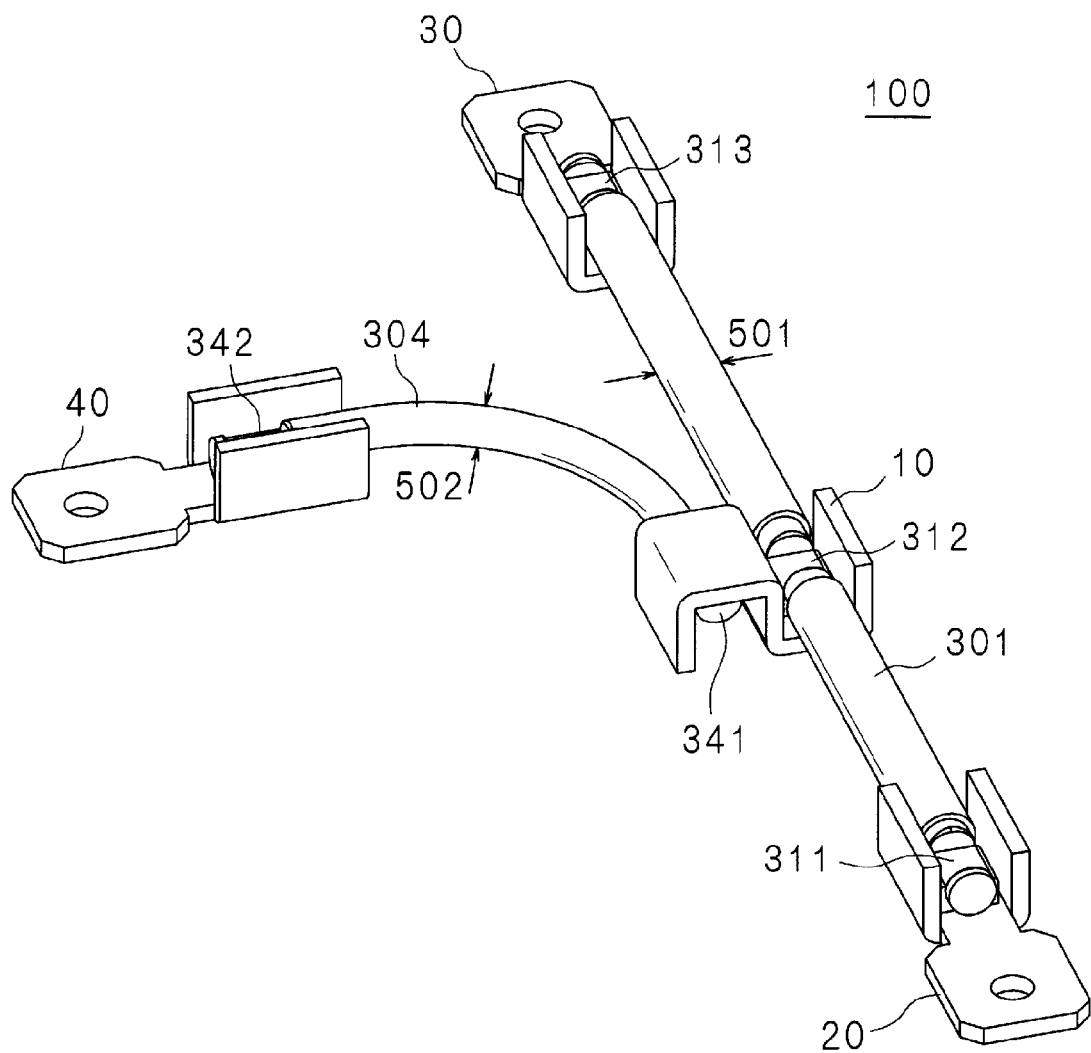
FIG. 7 is a diagram showing a variation of the current branching device.

Also, the current branching device 100 of the first embodiment is not limited to the above descriptions. FIG. 7 is a diagram showing a variation of the current branching device 100.

The variation of the current branching device 100 shown in FIG. 7 includes the main conductive wire 301 that is connected to the power source side and supplies a current to one supply destination (electrical component 401 in FIG. 1), a branch member 10 welded to the main conductive wire 301 at the intermediate portion of the main conductive wire 301, and a branch conductive wire 304 (branch conductive member) that is connected to the branch member 10 and supplies a current to another supply destination (electrical component 402 in FIG. 1).

The main conductive wire 301 is a copper wire covered by an insulating material, and the power source side terminal 20 is provided at one end on the power source side and the supply destination terminal 30 is provided at the other end.

At the one end of the main conductive wire 301, an exposed copper wire is welded and electrically connected to the power source side terminal 20 (welded portion 311) using ultrasonic welding, for example. At the other end of the main conductive wire 301 as well, an exposed copper wire is welded and electrically connected to the supply destination terminal 30 (welded portion 313) using ultrasonic welding, for example.

In the main conductive wire 301, the coating at the intermediate portion is stripped away and the exposed copper wire is welded and electrically connected to the branch member 10 (welded portion 312). The branch member 10 is welded to the intermediate portion of the main conductive wire 301 using ultrasonic welding, for example.

The branch conductive wire 304 is a copper wire coated by an insulating material. One end of the branch conductive wire 304 is connected to the branch member 10, and the other end of the branch conductive wire 304 is connected to the supply destination terminal 40. The one end of the branch conductive wire 304 is welded to the branch member 10 (welded portion 341) using ultrasonic welding, for example, and the other end thereof is welded to the supply destination terminal 40 (welded portion 342).

Also, in the variation of the current branching device 100, a diameter 502 of the branch conductive wire 304 is smaller than a diameter 501 of the main conductive wire 301. In other words, the copper wire of the branch conductive wire 304 is thinner than the copper wire of the main conductive wire 301.

Since a large current may flow from the power source side through the main conductive wire 301 connected to the power source side by the power source side terminal 20, the copper wire may need a sufficient diameter in order to accommodate such a large current. On the other hand, since a portion of the branched current branched by the branch member 10 flows through the branch conductive wire 304, the copper wire of the 304 need not have the same diameter as the main conductive wire 301.

Accordingly, in the variation of the current branching device 100, a branch wire that has a smaller diameter than the main conductive wire 301 is adopted as the branch conductive wire 304. Accordingly, the weight and manufacturing cost of the current branching device 100 can be reduced.

Second Embodiment

Figure 8:
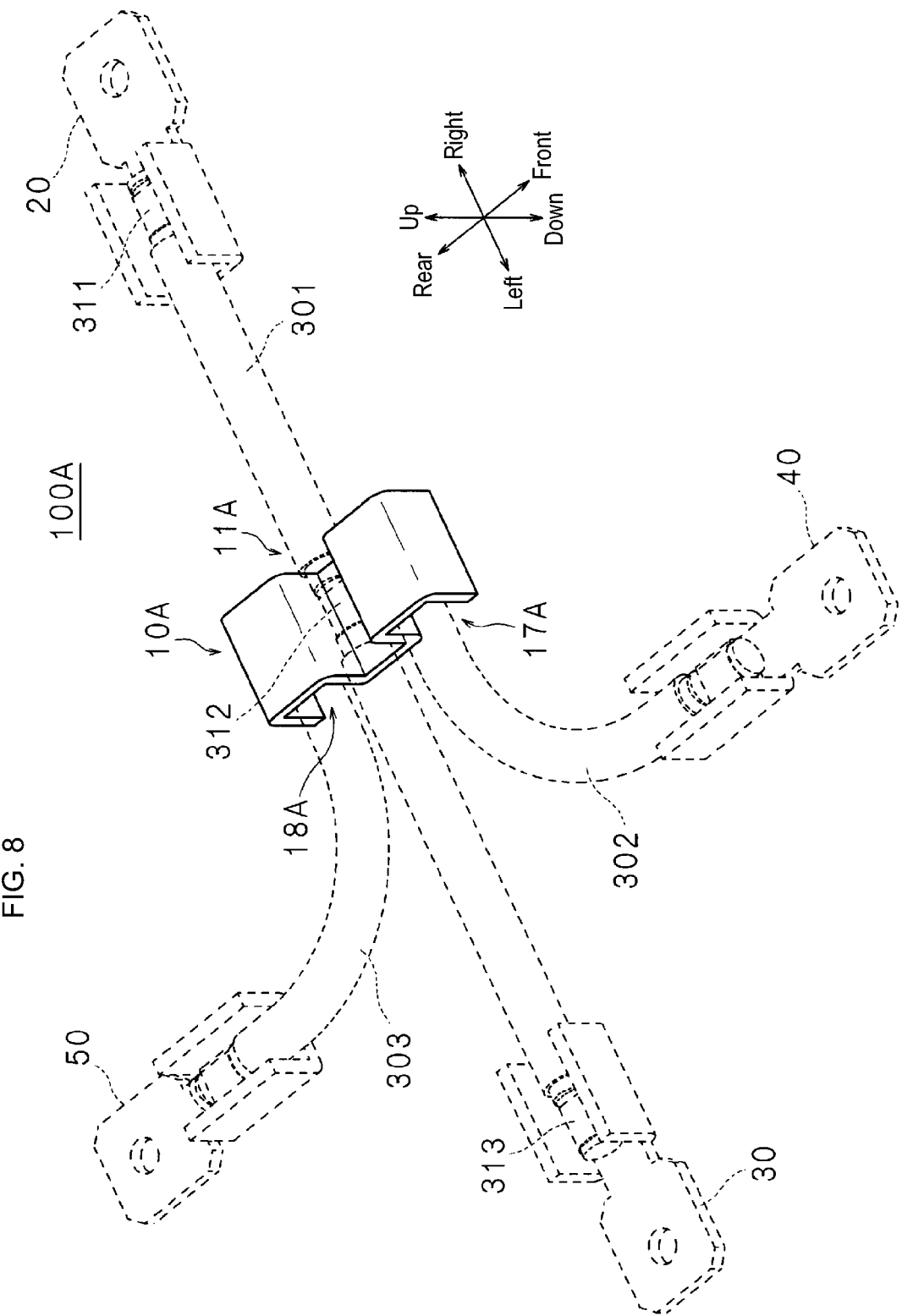
FIG. 8 is a perspective view showing the outer appearance of a branch member of a current branching device according to a second embodiment.

FIG. 8 is a perspective view showing the outer appearance of a branch member 10A of a current branching device 100A according to a second embodiment. Note that, in FIG. 8, for illustrative reasons, the remaining part of the current branching device 100A excluding the branch member 10A is represented by one dot chain lines.

As shown in FIG. 8, the branch member 10A includes one main line fixing portion 11A and two branch fixing portions 17A and 18A. The intermediate portion of the main conductive wire 301 is welded to the main line fixing portion 11A, one end of the branch conductive wire 302 is welded to the branch fixing portion 17A, and one end of the branch conductive wire 303 is welded to the branch fixing portion 18A. Welding of the main line fixing portion 11A and the main conductive wire 301 and welding of the branch fixing portions 17A and 18A and the branch conductive wires 302 and 303 are performed using ultrasonic welding or the like, as described above.

The main line fixing portion 11A and the branch fixing portions 17A and 18A have the same groove-like shape, and are arranged side by side in the width direction, and the branch fixing portion 17A and the branch fixing portion 18A are respectively provided on two sides of the main line fixing portion 11A. The main line fixing portion 11A and the branch fixing portion 17A are open to opposite sides to each other, the main line fixing portion 11A and the branch fixing portion 18A are also open to opposite sides to each other, and the branch fixing portions 17A and 18A are open to the same side. In other words, the main line fixing portion 11A has a U-shaped vertical cross section, and the branch fixing portions 17 and 18 have an inverse U-shaped vertical cross section.

Accordingly, a current from the power source side first flows through the main conductive wire 301 via the power source side terminal 20, and is branched at the intermediate portion of the main conductive wire 301 by the branch member 10A. A portion of the current flows to the supply destination terminal 30 (first electrical component) via the main conductive wire 301, and another portion of the current flows to the supply destination terminal 40 (second electrical component) via the branch conductive wire 302, and the remaining portion of the current flows to the supply destination terminal 50 (third electrical component) via the branch conductive wire 303. Accordingly, a current flowing through the main conductive wire 301 can be branched into a plurality of currents. The first, second, and third electrical components are not shown in the drawings.

Similar parts to the first embodiment are given the same reference signs, and the detailed descriptions thereof will be omitted.

Third Embodiment

Figure 9:
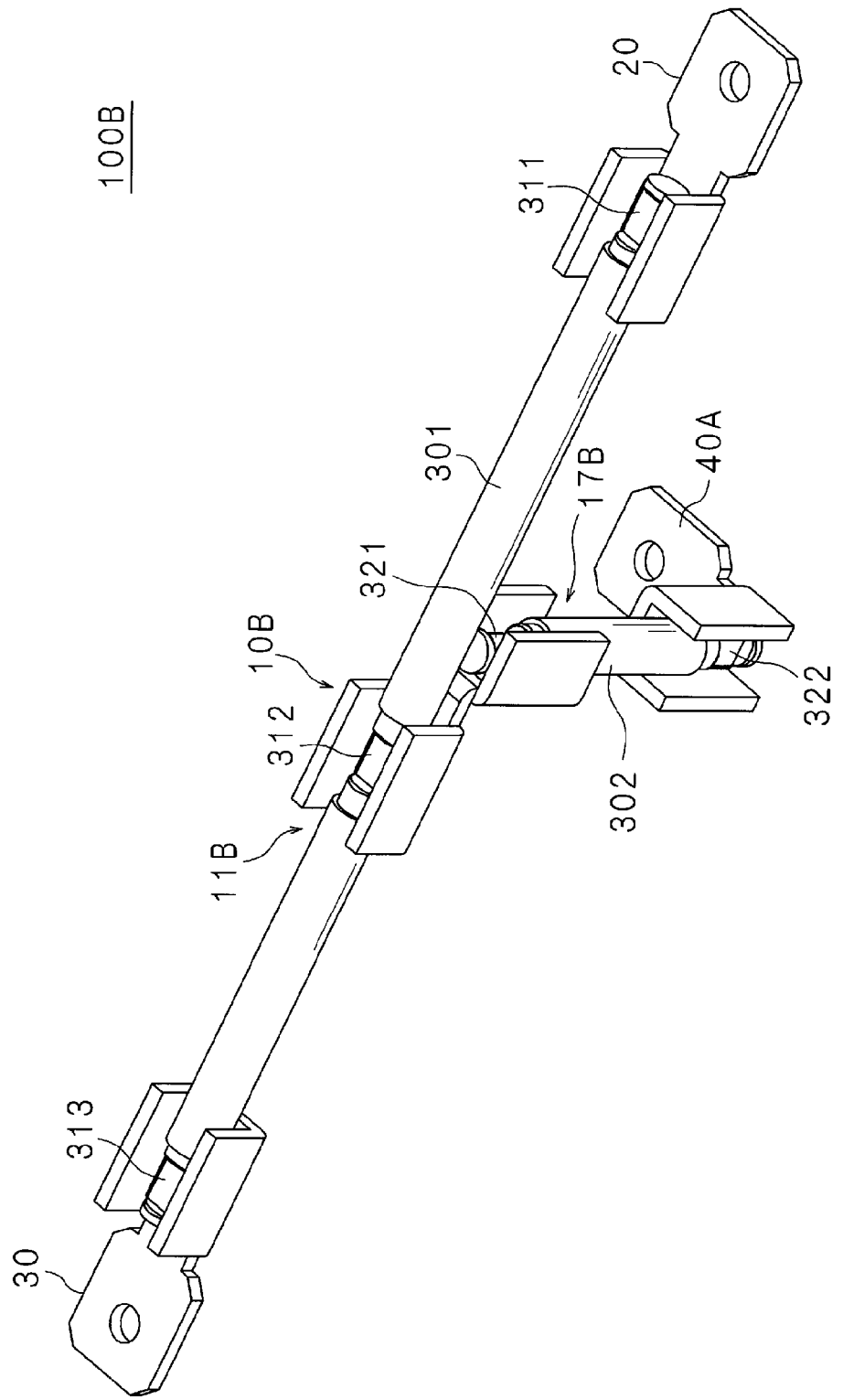
FIG. 9 is a perspective view showing a current branching device according to a third embodiment.

FIG. 9 is a perspective view showing a current branching device 100B according to a third embodiment.

The current branching device 100B includes a main conductive wire 301 that is connected to the power source side and supplies a current to one supply destination, a branch member 10B connected to the main conductive wire 301 at the intermediate portion of the main conductive wire 301, and a branch conductive wire 302 that is connected to the branch member 10B and supplies a current to another supply destination.

The main conductive wire 301 is a copper wire covered by an insulating material. At one end of the main conductive wire 301 on the power source side, an exposed copper wire is welded and electrically connected to the power source side terminal 20, while forming the welded portion 311, using ultrasonic welding, for example. At the other end of the main conductive wire 301, the exposed copper wire is welded and electrically connected to the supply destination terminal 30 while forming the welded portion 313, using ultrasonic welding, for example.

Further, in the main conductive wire 301, the coating at the intermediate portion is stripped away and the exposed copper wire is electrically connected to the branch member 10B. The intermediate portion (copper wire) of the main conductive wire 301 is welded to the branch member 10B while forming the welded portion 312, using ultrasonic welding, for example.

Also, the exposed copper wire at the one end of the branch conductive wire 302 is welded to the branch member 10B while forming the welded portion 321 using supersonic-welding, for example. Also, the exposed copper wire at the other end of the branch conductive wire 302 is welded to the supply destination terminal 40A while forming the welded portion 322 using supersonic-welding, for example.

Since the power source side terminal 20 and the supply destination terminal 30 have already been described in the first embodiment, and the supply destination terminal 40A has the same shape as the power source side terminal 20A shown in FIG. 4, the detailed description thereof will be omitted.

Figure 10A:
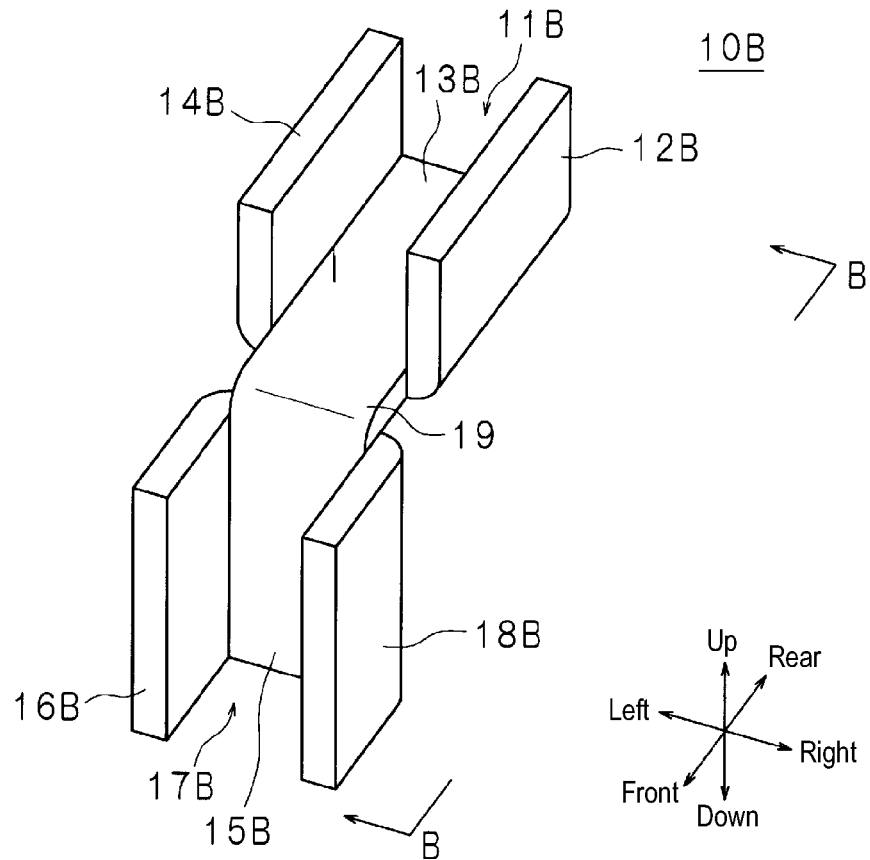
FIG. 10A is a perspective view showing a branch member.
Figure 10B:
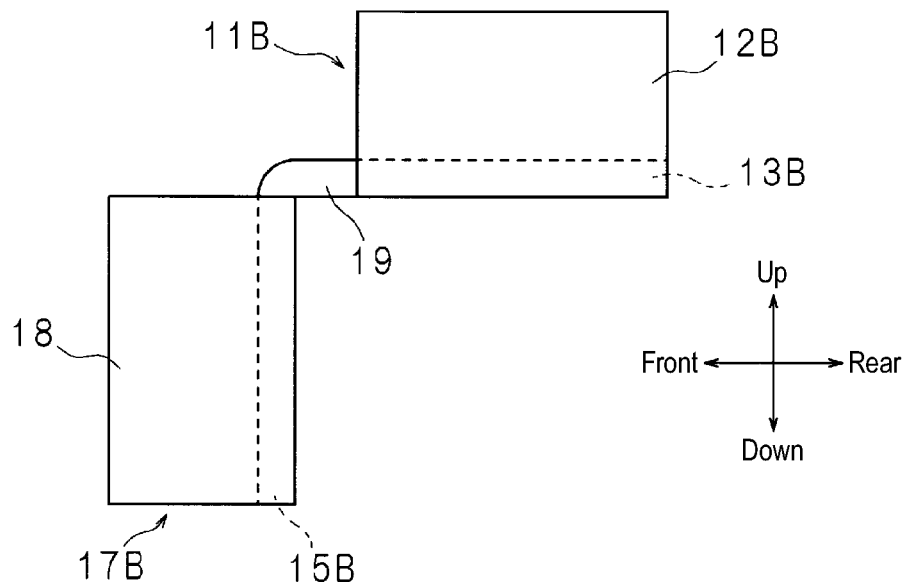
FIG. 10B is a diagram taken along arrows B-B in FIG. 10A.

FIG. 10 is a perspective view showing the branch member 10B. FIG. 10B is a diagram as seen along arrows B-B in FIG. 10A.

The branch member 10B is made of a conductive metal and includes a main line fixing portion 11B to which the intermediate portion of the main conductive wire 301 is welded and a branch fixing portion 17B to which one end of the branch conductive wire 302 is welded. The main line fixing portion 11B and the branch fixing portion 17B have the same groove-like shape.

The main line fixing portion 11B is formed by a rectangular bottom plate 13B that extends in the front-rear direction, and rectangular side plates 12B and 14B that stand perpendicular to edges of the two long-sides of the bottom plate 13B. Also, the branch fixing portion 17B is formed by a rectangular bottom plate 15B that extends in the up-down direction and rectangular side plates 16B and 18B that stand perpendicular to edges of the two long sides of the bottom plate 15B.

Out of the two ends of the bottom plate 13B in the longitudinal direction, a neck portion 19 extends from the front end, and the main line fixing portion 11B is linked to the branch fixing portion 17B via the neck portion 19. The neck portion 19 extends from one short side of the bottom plate 13B so as to be flush with the bottom plate 13B, and the branch fixing portion 17B is vertically provided at the leading end of the neck portion 19.

More specifically, the lateral dimensions of the bottom plate 13B of the main line fixing portion 11B, the neck portion 19, and the bottom plate 15B of the branch fixing portion 17B are the same, and the neck portion 19 is interposed between the bottom plate 13B and the bottom plate 15B.

In other words, the main line fixing portion 11B and the branch fixing portion 17B are arranged side by side in the lengthwise direction thereof. The branch fixing portion 17B is positioned in the lengthwise direction of the main line fixing portion 11B, and the main line fixing portion 11B is positioned in the lengthwise direction of the branch fixing portion 17B.

Also, the bottom plate 13B of the main line fixing portion 11B and the bottom plate 15B of the branch fixing portion 17B intersect each other, the main line fixing portion 11B is open upward, the branch fixing portion 17B is open forward, and the main line fixing portion 11B and the branch fixing portion 17B are open in directions intersecting each other. The main line fixing portion 11B, the branch fixing portion 17B, and the neck portion 19 are formed in one piece.

As configured above, in the current branching device 100B according to the third embodiment, wiring of the branch conductive wire 302 in the direction intersecting the main conductive wire 301 is facilitated. For example, in the case where an electrical component is disposed straight above or below a connection portion between the main conductive wire 301 and the branch member 10B, by using the current branching device 100B, the electrical component can be connected to the branch member 10B in the shortest distance. Accordingly, the branch conductive wire 302 can be shortened, and the weight and manufacturing cost of the current branching device 100B can be reduced.

Similar parts to those of the first embodiment are given the same reference signs and the detailed description will be omitted.

Fourth Embodiment

Figure 11:
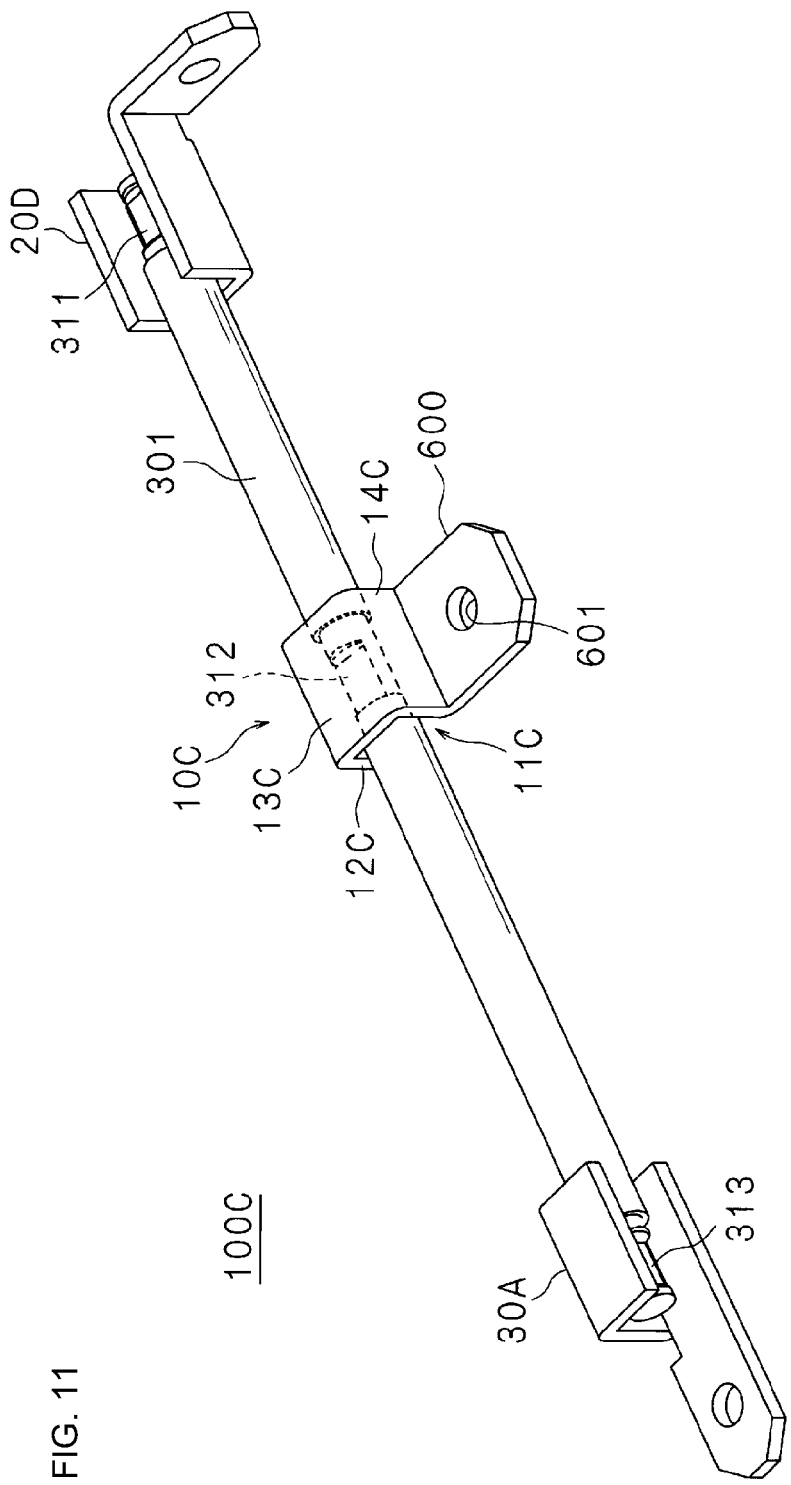
FIG. 11 is a perspective view showing a current branching device according to a fourth embodiment.

FIG. 11 is a perspective view showing a current branching device 100C according to a fourth embodiment.

The current branching device 100C includes the main conductive wire 301 that is connected to the power source side and supplies a current to one supply destination, a branch member 10C connected to the main conductive wire 301 at the intermediate portion of the main conductive wire 301, and a branch conductive plate 600 (branch conductive member) that is connected to the branch member 10C and supplies a current to another supply destination.

The main conductive wire 301 is a copper wire covered by an insulating material. In the main conductive wire 301, an exposed copper wire at one end on the power source side is welded and electrically connected to a power source side terminal 20D, while forming the welded portion 311, using ultrasonic welding, for example. At the other end of the main conductive wire 301, an exposed copper wire is welded and electrically connected to a supply destination terminal 30A while forming the welded portion 313, using ultrasonic welding, for example.

The supply destination terminal 30A substantially has the same shape as the power source side terminal 20C that has been already described using FIG. 6. Also, the power source fixing portion of the supply destination terminal 30A of the power source side terminal 20D is bent outward of the copper wire fixing portion.

Further, the exposed copper wire from which the coating has been stripped away at the intermediate portion of the main conductive wire 301 is welded and electrically connected to the branch member 10C. The intermediate portion (copper wire) of the main conductive wire 301 is welded to the branch member 10C using ultrasonic welding, for example.

The branch member 10C is made of a conductive metal and includes a main line fixing portion 11C to which the intermediate portion of the main conductive wire 301 is welded and a branch conductive plate 600 to be directly fixed to another supply destination. The main line fixing portion 11C and the branch conductive plate 600 are formed in one piece.

The main line fixing portion 11C is formed in a groove-like shape, and constituted by a rectangular bottom plate 13C and rectangular side plates 12C and 14C that stand perpendicular to edges of the two long sides of the bottom plate 13B. The welded portion 312 of the main conductive wire 301 is formed on the inner side of the main line fixing portion 11C.

As described above, the bottom plate 13C extends from the edge of one of the two long sides of the side plate 14C, and the branch conductive plate 600 extends from the edge of the other long side. The branch conductive plate 600 has a substantially rectangular plate shape, and is provided in parallel with the bottom plate 13C, or intersecting the side plate 14C. The corners on the leading end side of the branch conductive plate 600 are C-chamfered.

Also, a through hole 601 is formed in the center portion of the branch conductive plate 600. For example, by inserting a bolt into the through hole 601, and screwing the bolt to a screw hole provided in the electrical component, the branch conductive plate 600 is fixed to the electrical component.

As configured above, according to the current branching device 100C according to the fourth embodiment, for example, in the case where an electrical component is arranged along the main conductive wire 301, the branch conductive plate 600 of the branch member 10C near the electrical component can be directly fixed to the electrical component. Accordingly, a copper wire for connecting the branch member 10C and the electrical component is not required, and thus the weight, manufacturing cost, and size of the current branching device 100C can be reduced.

Further, in the current branching device 100C according to the fourth embodiment, since the intermediate portion of the main conductive wire 301 is fixed to an electrical component via the branch member 10C, the weight of the main conductive wire 301 and the branch member 10C can be prevented from acting on the two ends of the main conductive wire 301 in a concentrated manner.

The branch conductive plate 600 of the current branching device 100C according to the fourth embodiment is not limited to the description above. For example, another through hole may be formed in the branch conductive plate 600, in addition to the through hole 601.

In this case, the branch conductive plate 600 can be fixed to the electrical component using the through hole 601 and the other through hole, making it possible to electrically connect and fix the branch conductive plate 600 more reliably.

The branch member 10C according to the fourth embodiment is not limited to the above description. In the branch member 10C, the branch conductive plate 600 may be further provided on the side plate 12C, in addition to the side plate 14C.

Parts that are similar to those of the first embodiment are given the same reference signs and a detailed description thereof will be omitted.

The embodiments disclosed herein are exemplary in all aspects, and should not be considered to be restrictive. The scope of the present disclosure is not limited to the meanings described above, but defined in the claims, and intended to include all modifications within the meaning and the scope equivalent thereof.

The invention claimed is:

1. A current branching device for branching a current and supplying the current to a plurality of supply destinations, comprising:
   a branch member including a main line fixing portion and a branch fixing portion, wherein the main line fixing portion includes a bottom plate, an intermediate plate, and a first side plate, wherein the bottom plate, the intermediate plate, and the first side plate are planar members and the bottom plate is interposed between a bottom of both the intermediate plate and the first side plate and is orthogonal to both the intermediate plate and the first side plate, and wherein the branch fixing portion includes a top plate and a second side plate that are planar members, wherein the top plate is connected to a top of the intermediate plate and a top of the second side plate, at least one of the bottom plate, the intermediate plate and the first side plate of the main line fixing portion welded to a main conductive wire at an intermediate portion of the main conductive wire for supplying a current to one supply destination; and
   at least one branch conductive member welded to at least one of the second side plate and top plate of the branch fixing branch member, for supplying a current to another supply destination that is different from the one supply destination.

2. The current branching device according to claim 1, wherein the main line fixing portion and the branch fixing portion have a groove-like shape, are arranged side by side in a width direction, and are open to opposite sides to each other.

3. The current branching device according to claim 1, wherein the branch member includes:
   a main line fixing portion to which the main conductive wire is welded; and
   a branch fixing portion to which the branch conductive member is welded, and
   the main line fixing portion and the branch fixing portion have a groove-like shape, are arranged side by side in a longitudinal direction thereof, and are open in directions intersecting each other.

4. The current branching device according to claim 1, the branch conductive member has a plate-like shape, and is provided with a through hole used to fix the branch conductive member to the other supply destination.

5. The current branching device according to claim 1, wherein the branch conductive member is a conductive wire, and is thinner than the main conductive wire.

6. The current branching device according to claim 2, wherein the branch conductive member is a conductive wire, and is thinner than the main conductive wire.

7. The current branching device according to claim 4, wherein the branch conductive member is a conductive wire, and is thinner than the main conductive wire.

* * * * *